April 15, 1924.
F. M. PARKS
CONTROL SYSTEM
Filed Sept. 24, 1920
1,490,228
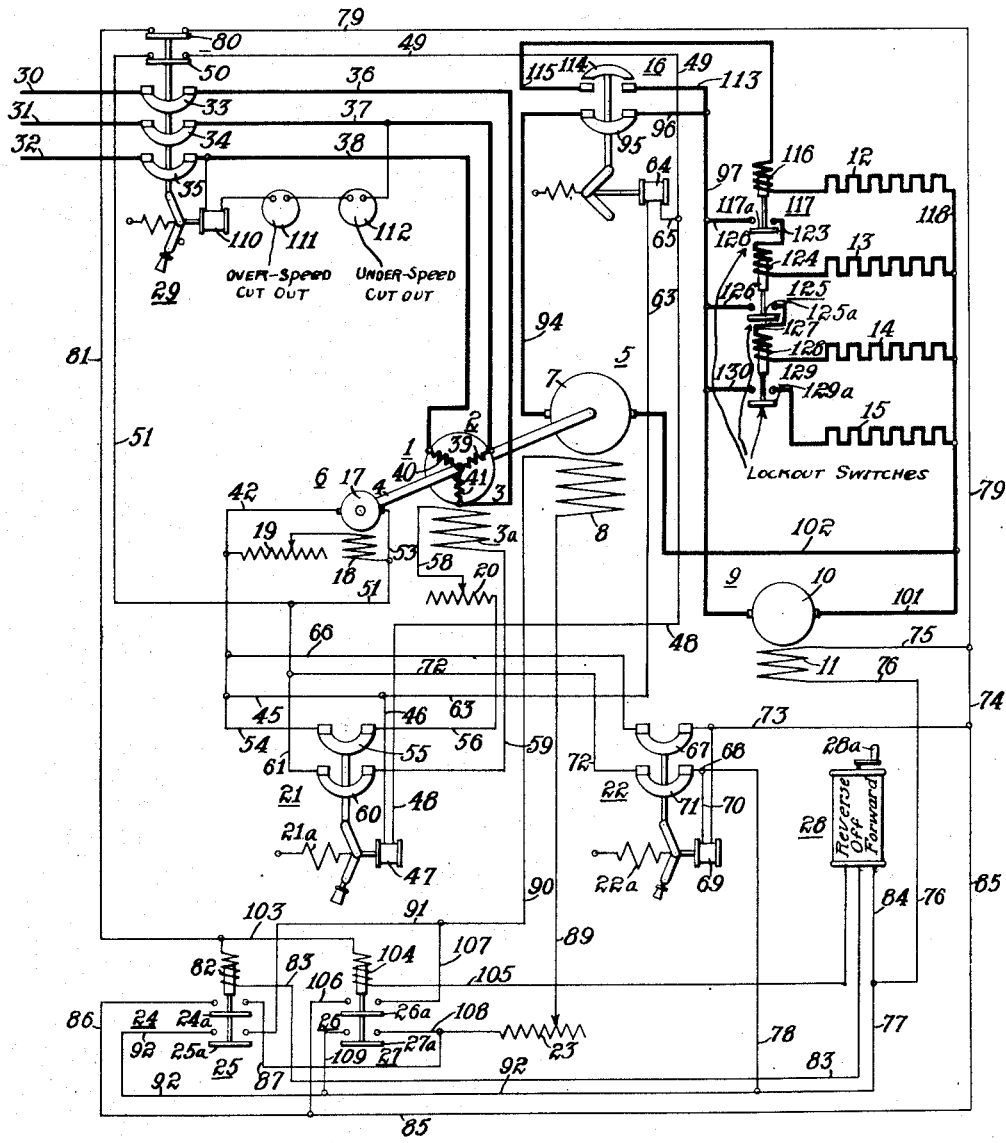
WITNESSES:
H. T. Shelhamer
H. C. Lowe
INVENTOR
Fred M. Parks
BY
Wesley G. Carr
ATTORNEY Patented Apr. 15, 1924.

1,490,228

UNITED STATES PATENT OFFICE.

FRED M. PARKS, OF MURRYSVILLE, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed September 24, 1920. Serial No. 412,483.

*To all whom it may concern:*

Be it known that I, FRED M. PARKS, a citizen of the United States, and a resident of Murrysville, in the county of Westmoreland and State of Pennsylvania, have invented a new and useful Improvement in Control Systems, of which the following is a specification.

My invention relates to motor-control systems and it has particular relation to control systems to be employed with hoists, especially those required to lift heavy loads such, for example, as in coal and metal mines.

The object of my invention is to protect a motor-generator set and a motor energized thereby from injury that would be caused by the motor running away by reason of the failure of the supply source of energy for the motor-generator set or of other causes hereinafter set forth.

In motor-control systems employing a motor-generator set and a hoist motor, it has sometimes happened that the running circuit-breaker for the motor of the motor-generator set opened because of loss of power or an overload, while the hoist motor was lowering an unbalanced load. Under such conditions, the motor-generator set is incapable of exerting substantially any braking effort to prevent the rapid rotation of the hoist motor, and injury will result to the apparatus unless some provision is made to stop the motor.

Briefly speaking, my invention consists in providing a double-throw contactor between the armature of a generator and the armature of a driven motor and rendering it responsive to the opening and closing of an overload circuit-breaker which controls the source of supply to the primary winding of a synchronous motor that drives the generator. When this contactor opens the armature circuit of the generator, it closes a dynamic braking circuit for the driven motor. Contactors in series relation with the field-magnet windings of the synchronous motor and of the generator are opened, when the circuit breaker is opened, thereby deenergizing the synchronous motor and the generator. The field-magnet winding of the driven motor continues to be energized, during dynamic braking of the motor, by an auxiliary generator that is mechanically connected to the motor-generator set. The flywheel action of the motor-generator set operates the auxiliary generator for some time after the overload circuit-breaker has opened.

For a better understanding of my invention, reference should now be had to the accompanying drawing in which the single figure is a complete diagrammatic view of a motor control system embodying my invention.

A synchronous motor 1, having an armature 2 and a rotor 3 provided with a field-magnet winding 3a, drives a shaft 4, which operates the generator 5, and a small auxiliary or exciting generator 6. The generator 5 has an armature 7 and a field-magnet winding 8, which is excited by direct current from the exciting generator 6. A hoist motor 9 has its armature 10 energized by the generator 5 and its field-magnet winding 11 energized by the exciting generator 6. A dynamic braking circuit having resistors 12, 13, 14 and 15 is provided for the motor 9 and is controlled by a contactor 16 which is normally so closed when the system is not in operation as to complete a circuit through one of these resistors and the armature 10 of the motor 9.

The exciting motor 6 has an armature 17 and a shunt field-magnet winding 18. The shunt field-magnet winding 18 is controlled by a field rheostat 19. The field-magnet winding 3ª of the synchronous motor 1 is energized by the exciting generator 6 and is controlled by a field rheostat 20 and a circuit-breaker 21. A circuit-breaker 22 controls the energization of the field-magnet winding 11 of the driven motor 9, which is energized by the exciting generator 6. The circuit-breaker 22 is connected in series relation with the field-magnet winding 8 of the generator 5, which is energized by the exciting generator 6. The field-magnet winding 8 is connected in series relation with a field rheostat 23, which controls the strength of the generator field 8 and thereby the energization of the armature 10 of the motor 9.

The direction of energization of the field-magnet winding 8 of the generator 5 is controlled by directional contactors 24, 25, 26 and 27, and a generator field controller 28. The energization of the whole system is controlled by the manually operated three-pole circuit-breaker 29, which opens and closes the circuit comprising the primary winding 2 of the synchronous motor 1.

The operation of the system is started by closing the circuit-breaker 29, thereby energizing the synchronous motor 1 from line conductors 30, 31 and 32 through contact members 33, 34 and 35 of circuit-breaker 29, conductors 36, 37 and 38 and primary windings 39, 40 and 41 of the armature 2. The rotor 3 of the motor 1 is also provided with induction bars or windings, not shown, which are employed to start the motor and bring it to a certain speed; after which the closure of the direct current field circuit brings the motor to synchronous speed, in accordance with familiar principles.

As soon as the synchronous motor 1 is started, it operates the shaft 4 to drive the small exciting generator 6, which will be hereinafter termed "the exciter", thereby energizing the field-magnet winding 3a of the motor 1 with direct current. The circuit-breaker 21, which controls the energization of the field-magnet winding 3a of the motor 1, is manually operated, and is provided with a spring 21a for maintaining it normally open. A circuit for holding the circuit-breaker 21 in its closed position, after it is closed, is provided from the armature 17 of the exciter 6 through conductors 42, 45 and 46, no-voltage release coil 47, conductors 48 and 49, contact member 50 which is mechanically connected to the circuit-breaker 29, conductors 51 and 53 to armature 17 of the exciter 6.

The field-magnet winding 3a of the synchronous motor 1 is energized by a circuit which is established from armature 17 of exciter 6 through conductors 42 and 54, contact member 55 of circuit-breaker 21, conductor 56, field rheostat 20, conductor 58, field-magnet winding 3 of the synchronous motor 1, conductor 59, contact member 60 of circuit-breaker 21 and conductors 61 and 53 to armature 17 of exciter 6.

The synchronous motor 1, having been brought to full speed and the exciter 6 so operated that it is capable of fully energizing the field-magnet winding 8 of the generator 5 and the field-magnet winding 11 of the driven motor 9, the circuit-breaker 22 may now be closed. The circuit-breaker 16, which controls the dynamic braking circuit of the driven motor 9, has already been raised from its normal lower position to its upper position, by a circuit that is established from the exciter 6 through conductors 42, 45 and 63, a no-voltage release coil 64, conductors 65 and 49, contact member 50 of the circuit-breaker 29 and conductors 51 and 53 to the armature 17 of the exciter 6.

The circuit-breaker 22, when closed by hand, establishes a holding circuit therefor from the armature 17 of the exciter 6 through conductors 42 and 66, contact member 67 of the circuit-breaker 22, conductor 68, no-voltage release coil 69 of the circuit-breaker 22, conductor 70, contact member 71 of the circuit-breaker 22 and conductors 72, 51 and 53 to the armature 17 of the exciter 6.

The field-magnet winding 11 of the driven motor 9 is now energized by a circuit established from the armature 17 of the exciter 6 through conductors 42 and 66, contact member 67 of the circuit-breaker 22, conductors 73, 74 and 75, field-magnet winding 11, conductors 76, 77 and 78, contact member 71 of the circuit-breaker 22 and conductors 72, 51 and 53 to the armature 17 of the exciter 6.

The operation of the control system is now controlled by the generator field controller 28 which will be assumed to have been moved from its off position to its forward position, thereby establishing a circuit from the armature 17 of exciter 6 through conductors 42 and 66, contact member 67 of circuit-breaker 22, conductors 73 and 74, contact member 80 of circuit-breaker 29, conductor 81, actuating coil 82 of reversing contactors 24 and 25, conductor 83, through master controller 28, conductors 84, 77 and 78, contact member 71 of the circuit-breaker 22 and conductors 72, 51 and 53 to the armature 17 of the exciter 6.

When this circuit is established, the actuating coil 82 closes the reversing contactors 24 and 25, thereby completing the circuit to the field-magnet winding 8 of the generator 5. This circuit extends from armature 17 of exciter 6 through conductors 42 and 66, contact member 67 of the circuit-breaker 22, conductors 73, 85 and 86, contact member 24a of the contactor 24, conductor 87, field rheostat 23, conductor 89, field-magnet winding 8 of the generator 5, conductors 90 and 91, contact member 25a of the contactor 25, conductors 92 and 78, contact member 71 of the circuit-breaker 22 and conductors 72, 51 and 53 to the armature 17 of the exciter 6.

The armature 10 of the motor 9 is now energized by a circuit that extends from the armature 7 of the generator 5 through conductor 94, contact member 95 of circuit-breaker 16, conductors 96 and 97, armature 10 of motor 9, and conductors 101 and 102 to armature 7 of generator 5. The speed of the motor 9 may be increased by increasing the field strength of the field-magnet winding 8 of the generator 5. This is done by reducing the effective resistance of the field-rheostat 23, which is in series with the field-magnet winding 8 of the generator 5.

The operation of the motor 9 may be reversed by movement of the controller handle 28a of the generator field controller 28 to its reverse position, thereby opening the reversing contactors 24 and 25 and closing the contactors 26 and 27 through a circuit established from the armature 17 of the exciter 6 through conductors 42 and 66, contact member 67 of the circuit-breaker 22, conductors 73, 74 and 79, contact member 80 of the circuit-breaker 21, conductors 81 and 103, actuating coil 104, conductor 105, through the master controller 28, conductors 84, 77 and 78, contact member 71 of the circuit-breaker 22 and conductors 72, 51 and 53 to the armature 17 of the exciter 6. The energization of the actuating coil 104 causes the reversing contactors 26 and 27 to close, thereby establishing a circuit through the field-magnet winding 8 of the generator 5. This circuit extends from the armature 17 of the exciter 6 through conductors 42 and 66, contact member 67 of the circuit-breaker 22, conductors 73, 85 and 106, contact member 26a of the contactor 26, conductors 107 and 90, field-magnet winding 8 of the generator 5, conductor 89, field rheostat 23, conductor 108, contact member 27a of the contactor 27, conductors 109, 92 and 78, contact member 71 of the circuit-breaker 22 and conductors 72, 51 and 53 to the armature 17 of the exciter 6.

The consequent reversal of the current through the field-magnet winding 8 of the generator 5 causes reversal of the current through the circuit comprising the armature of the generator 5 and the armature 10 of the driven motor 9, thereby reversing the operation of the driven motor 9.

The circuit-breaker 29 is provided with a no-voltage release coil 110, an over-speed cutout 111 and an under-speed cutout 112, of familiar types. The over-speed cutout 111 and the under-speed cutout 112 are responsive to the speed of the synchronous motor 1 and if, for any reason, the motor 1 should exceed the allowable variations in speed, these cutouts will open the circuit breaker 29, as will also the no-voltage release coil 110 upon failure of the line voltage. As soon as the circuit-breaker 29 opens, the primary windings 39, 40 and 41 of the motor 1 are de-energized and the field-magnet winding 3a thereof is de-energized by the opening of the circuit-breaker 21, which is controlled by the no-voltage release mechanism 47. The no-voltage release mechanism 47, in turn, is de-energized by the breaking of the circuit through the contact member 50 of the circuit-breaker 29.

The no-voltage release coil 64 is de-energized by the opening of the circuit comprising it and the contactor 50, which is mechanically actuated by the circuit-breaker 29.

The circuit-breaker 16 is also opened by the de-energization of the no-voltage release coil 64. The opening of the circuit-breaker 16 breaks the circuit between the armature 7 of the generator 5 and the armature 10 of the motor 9.

A dynamic-braking circuit is established through the armature 10 of the motor 9 by the closing of the back contactor 114 of the circuit-breaker 16. The dynamic-braking circuit established thereby extends from the armature 10 of the motor 9 through conductors 97 and 113, contact member 114 of the circuit-breaker 16, conductor 115, actuating coil 116 of the lockout relay or switch 117, resistor 12 and conductors 118 and 101 to the armature 10 of the motor 9.

The flywheel effect of the motor-generator set causes the exciter 6 to still energize the field-magnet winding 11 of the driven motor 9, and dynamic braking of the motor 9 is started.

As soon as the current through the actuating coil 116 of the relay 17 falls to a predetermined value, the contact member 117a assumes its closed position. This establishes a second dynamic-braking circuit in parallel with the first from the conductor 97, through conductor 122, contact member 117a, conductor 123, actuating coil 124 of the relay 125 and resistor 13 to conductor 119. As soon as the current decreases in the actuating coil 124 sufficiently to permit the closing of the relay 125, a third dynamic-braking circuit is established from the conductor 97 through conductors 126, contact member 125a of the relay 125, conductor 127, actuating coil 128 of the relay 129 and resistor 14 to conductor 120.

As soon as the current through the three resistors 12, 13 and 14 falls to a predetermined value, the actuating coil 128 will be sufficiently de-energized to close the relay 129, thereby connecting the resistor 15 in parallel with the other resistors through a circuit from conductor 97 through conductor 130, contact member 129a of the contactor 129 and resistor 15 to conductor 118.

By inserting the resistors 12, 13, 14 and 15 successively into the armature circuit of the driven motor 9, the latter is brought to a gradual stop, and brakes operated either mechanically or electrically may then be applied to the hoist in any manner well known to the art to hold the hoisting apparatus stationary.

When the main circuit-breaker 29 is opened, it causes the contactor 80, which is mechanically connected thereto, to open, thereby breaking the circuit which comprises the actuating coils 82 and 104. The de-energization of the actuating coil 82 will open the reversing contactors 24 and 25 and the de-energization of the actuating coil 104 will likewise open the reversing contactors 26 and 27. The opening of these reversing contactors de-energizes the field-magnet winding 8, thereby completely de-energizing the generator 5.

After the speed of the exciting generator 6 has become relatively slow, the no-voltage release coil 69 is sufficiently de-energized to permit the circuit-breaker 22 to be opened by the spring 22a. This does not occur as long as the flywheel effect of the motor-generator set continues. The field-magnet winding 11 of the motor 9 is de-energized as soon as the circuit-breaker 22 is opened.

It will be observed by those skilled in the art that by my invention I have provided a simple and effective means to prevent injury to the motor-control system of a hoist, upon the failure of the line voltage or the overspeeding or underspeeding of the motor-generator set, and the apparatus constructed in accordance therewith will be effective and positive in operation.

While I have shown my invention in a preferred form, it is apparent that minor modifications may be made in the arrangement of circuits and contactors without departing from the spirit thereof. I desire, therefore, to be limited only by the scope of the appended claims.

I claim as my invention:

1. In a motor-control system, the combination with a driving machine, and a driven machine, of automatic means for effecting braking of said driven machine in successive steps upon the failure of said driving machine.

2. In a motor-control system, the combination with a driving machine, and a driven machine, of automatic means for effecting electrical braking of said driven machine in successive steps upon the failure of said driving machine.

3. In a motor-control system, the combination with a driving machine, and a driven machine, of automatic means for effecting dynamic braking of said driven machine in successive steps upon the failure of said driving machine.

4. In a motor-control system, the combination with a driving machine, and a driven machine, of means controlled by said driving machine for effecting electrical braking of said driven machine in successive steps upon the failure of said driving machine.

5. In a motor-control system, the combination with a source of electrical power, a motor-generator set and a motor energized by said set, of means for effecting electrical braking of said motor upon the failure of said power.

6. In a motor-control system, the combination with a driving machine and a driven machine, of means controlled by said driving machine for effecting dynamic-braking of said driven machine in successive steps upon the failure of said driving machine.

7. In a motor-control system, the combination with a source of electrical power, a motor-generator set and a motor energized by said set, of means for effecting dynamic braking of said motor upon the failure of said power.

8. In a motor-control system, the combination with a motor-generator set and a motor energized by said set, of means comprising a line switch for energizing said set, and means for effecting dynamic braking of said motor upon the opening of said switch.

9. In a motor-control system, the combination with a motor-generator set and a motor energized by said set, of means comprising a line switch for energizing said set, and means for effecting dynamic braking of said motor in successive steps upon the opening of said switch.

10. In a motor-control system, the combination with a dynamo-electric machine and a motor driven thereby, of means controlled by said machine for effecting dynamic braking of said motor in successive steps upon the failure of said machine.

11. In a motor-control system, the combination with a dynamo-electric machine and a motor armature driven thereby, of a resistor, means for connecting said resistor in a closed circuit with said motor armature, and means controlled by said machine for operating said connecting means upon the failure of said machine.

12. In a motor-control system, the combination with a dynamo-electric machine and a motor armature driven thereby, of a resistor, a contactor for connecting said resistor in a closed circuit with said armature and means controlled by said machine for operating said contactor.

13. In a motor-control system, the combination with a dynamo-electric machine and a motor armature driven thereby, of a plurality of resistors, a contactor for connecting one of said resistors in a closed circuit with said armature, means controlled by said machine for operating said contactor upon the failure of said machine, and means for connecting said resistors successively to said armature.

14. In a motor-control system, the combination with a dynamo-electric machine, and a motor armature driven thereby, of a plurality of resistors, means controlled by said machine for connecting said resistors successively in a closed circuit with said motor upon the failure of said machine.

15. In a motor-control system, the combination with a dynamo-electric machine having a field-magnet winding, and means for controlling the energization of said machine, of a motor having a field-magnet winding driven by said machine, an exciter for energizing said windings, and means comprising said exciter for effecting dynamic braking of said motor said dynamic braking means being operated by said controlling means.

16. In a motor-control system, the combination with a dynamo-electric machine, and a circuit-breaker controlled thereby for de-energizing said machine, of a motor driven by said machine, and means for effecting dynamic braking of said motor, said means being controlled by the opening and the closing of said circuit-breaker.

17. In a motor-control system, the combination with a dynamo-electric machine, and a circuit-breaker controlled thereby for de-energizing said machine, of a motor driven by said machine, and means for effecting dynamic braking of said motor in successive stages, said dynamic braking means being controlled by said circuit-breaker.

18. In a motor-control system, the combination with a driving motor, a generator driven by said motor, and a driven motor energized by said generator, of means for effecting dynamic braking of said driven motor upon the failure of said driving motor.

19. In a motor-control system, the combination with a driving motor, a generator driven by said motor, and a driven motor energized by said generator, of means for effecting dynamic braking of said motor and for de-energizing said generator upon the de-energization of said driving motor.

20. In a motor-control system, the combination with a driving motor, a generator driven by said motor, and a driven motor energized by said generator, of a circuit-breaker for de-energizing said driving motor, means controlled by said circuit-breaker for effecting dynamic braking of said motor, and means controlled by said circuit-breaker for de-energizing said generator.

21. In a motor-control system, the combination with a driving motor, a generator driven by said motor and a driven motor energized by said generator, of means for simultaneously effecting dynamic braking of said driven motor and for de-energizing said generator.

22. In a motor-control system, the combination with a dynamo-electric machine, means for driving said machine, and a motor energized by said machine, of means for simultaneously effecting dynamic braking of said motor and for de-energizing said machine, said means being operated by the failure of said driving means.

23. In a motor-control system, the combination with a driving motor, a generator driven by said motor and a driven motor having its armature energized by said generator, of separate means comprising a generator for energizing the field-magnet winding of said driving motor, the field-magnet winding of said generator and the field-magnet winding of said driven motor, a dynamic-braking circuit for said driven motor, a circuit-breaker for said driving motor, means controlled by said circuit-breaker for de-energizing said field-magnet winding of said driving motor and said field-magnet winding of said generator, and means controlled by said circuit-breaker for de-energizing the armature of said generator and for connecting the armature of said driven motor in series with said dynamic-braking circuit.

In testimony whereof, I have hereunto subscribed my name this 17th day of September, 1920.

FRED M. PARKS.